United States Patent [19]

Machida et al.

[11] Patent Number: 4,511,962
[45] Date of Patent: Apr. 16, 1985

[54] MEMORY CONTROL UNIT

[75] Inventors: Tetsuo Machida, Machida; Susumu Tsuhara, Sagamihara; Kuniaki Tabata, Tokyo; Yasuyuki Okada, Sagamihara, all of Japan

[73] Assignee: Hitachi, Ltd., Tokyo, Japan

[21] Appl. No.: 390,644

[22] Filed: Jun. 21, 1982

[30] Foreign Application Priority Data

Jul. 1, 1981 [JP] Japan .................. 56-101238

[51] Int. Cl.³ .................. G06F 13/06; G06F 7/00
[52] U.S. Cl. .................. 364/200; 340/724; 340/750; 340/801
[58] Field of Search ........ 340/709, 798, 799, 724–726, 340/750; 364/200, 900

[56] References Cited

U.S. PATENT DOCUMENTS

| | | | |
|---|---|---|---|
| 4,094,000 | 6/1978 | Brudevold | 340/750 X |
| 4,129,859 | 12/1978 | Iwamura et al. | 340/750 X |
| 4,196,430 | 4/1980 | Denko | 340/799 X |
| 4,197,590 | 4/1980 | Sukonick et al. | 340/726 X |
| 4,303,986 | 12/1981 | Lans | 340/750 X |

Primary Examiner—James D. Thomas
Assistant Examiner—David L. Clark
Attorney, Agent, or Firm—Antonelli, Terry & Wands

[57] ABSTRACT

A memory control unit for a computer has the function of extracting or synthesizing only a necessary portion from or to two-dimensional image scan data, in addition to a conventional main memory function. It comprises an address controller for calculating an address of data to be transferred based on source and destination start addresses $A_1$ and $A_2$ of the two-dimensional image scan data, a lateral length $W_1$ and a longitudinal length of the necessary portion, and lengths $I_1$ and $I_2$ of unnecessary portion, and a controller for controlling memory read-/write operation.

13 Claims, 7 Drawing Figures

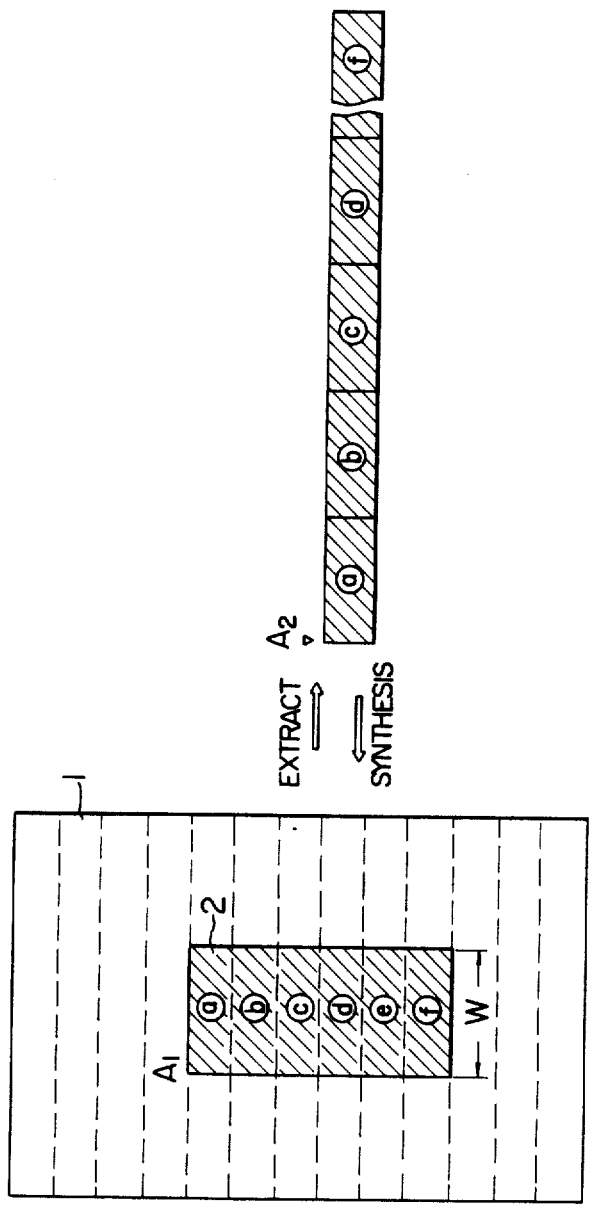

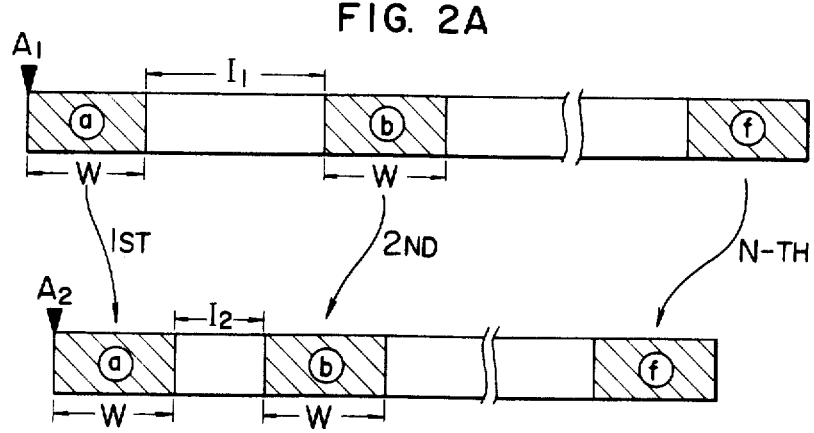
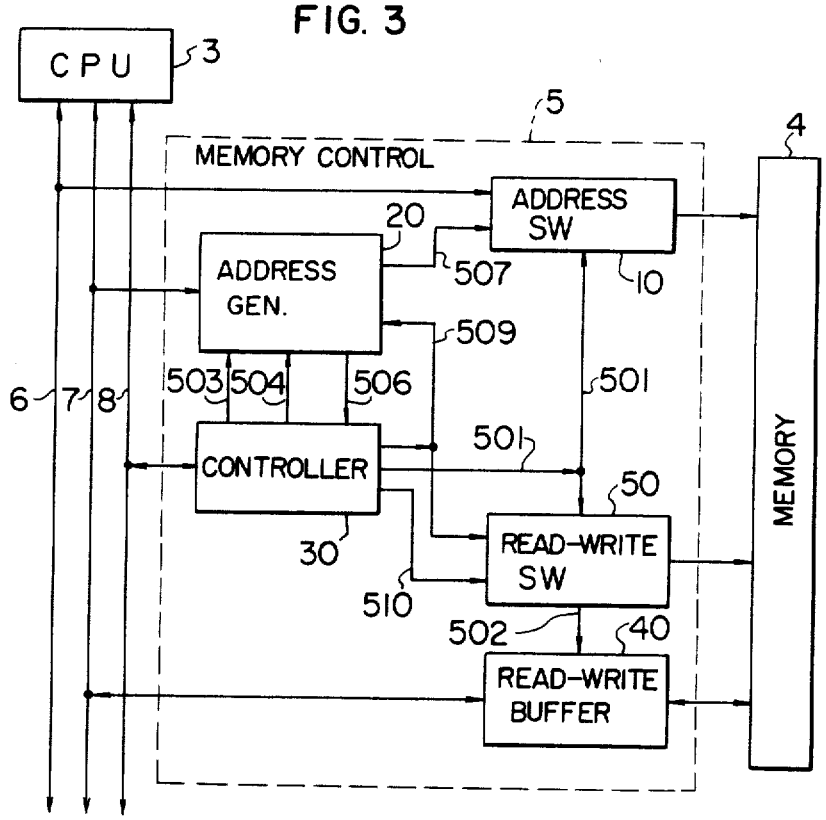

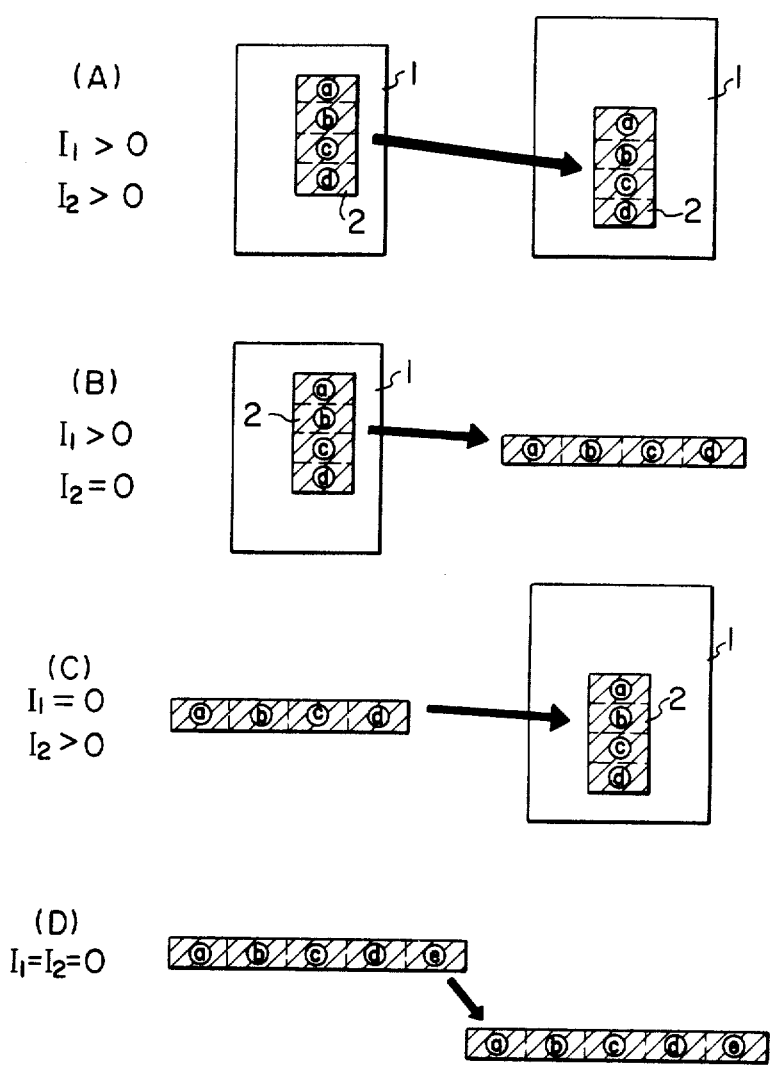

MEMORY CONTROL UNIT

BACKGROUND OF THE INVENTION

1. Field of the Invention

The present invention relates to a memory control unit for a computer for processing two-dimensional image data, and more particularly to a memory control unit used to extract only a necessary portion of two-dimensional image scan data at a high speed to store it in continuous or discontinuous areas of a memory unit and synthesize partial image data stored in the memory unit at a predetermined portion of a two-dimensional image data.

2. Description of Prior Art

It has been known to scan document data of references or documents by a facsimile to write the data into a memory of a computer. A process for selecting only data relating to a partial image from the document image data written into the memory and transferring it to another memory area is called a partial image extraction. As shown in FIG. 1, partial image data 2 in a hatched area of two-dimensional image data 1 stored in the memory is extracted and loaded into continuous areas of a memory. The opposite process is called synthesis.

The extraction/synthesis process of the two-dimensional image data has heretofore been carried out by software which involves a long processing time. Assuming that the resolution of the scan lines of the facsmile is eight lines/mm, the overhead per data transfer is one millisecond and a data transfer rate is one megabyte/second, it usually takes five seconds or more to extract 60 blocks of a partial image data of 1 cm × 10 cm area.

SUMMARY OF THE INVENTION

It is a primary object of the present invention to provide a memory control unit capable of extracting and synthesizing document image data at a high speed.

It is another object of the present invention to provide a memory control unit capable of extracting and synthesizing document image data without causing a bus overload by decreasing the number of times of transfer of the document image data through a data bus.

It is a further object of the present invention to provide a memory control unit capable of extracting and synthesizing document image data and moving a partial image by transferring data stored in continuous or discontinuous areas of a memory unit to other continuous or discontinuous areas.

In order to achieve the above objects, in accordance with the present invention, the memory control unit is connected between the memory unit and a processor such that read/write operations of the memory are selectively carried out in one of two modes. In a first mode of operation, data are transferred between the processor and the memory unit in a conventional manner. In a second mode of operation, data in certain areas of the memory unit is transferred to other areas of the same memory unit through the memory control unit. In the second mode of operation, the extraction and synthesis functions of the document image data are attained.

BRIEF DESCRIPTION OF THE DRAWINGS

FIG. 1 llustrate extraction and synthesis functions of image data.

FIGS. 2A and 2B illustrate a relationship between data transfer and movement, extraction, synthesis and block transfer of the image data.

FIG. 3 shows a block diagram of one embodiment of a memory control unit of the present invention.

DESCRIPTION OF THE PREFERRED EMBODIMENTS

Figure 4:
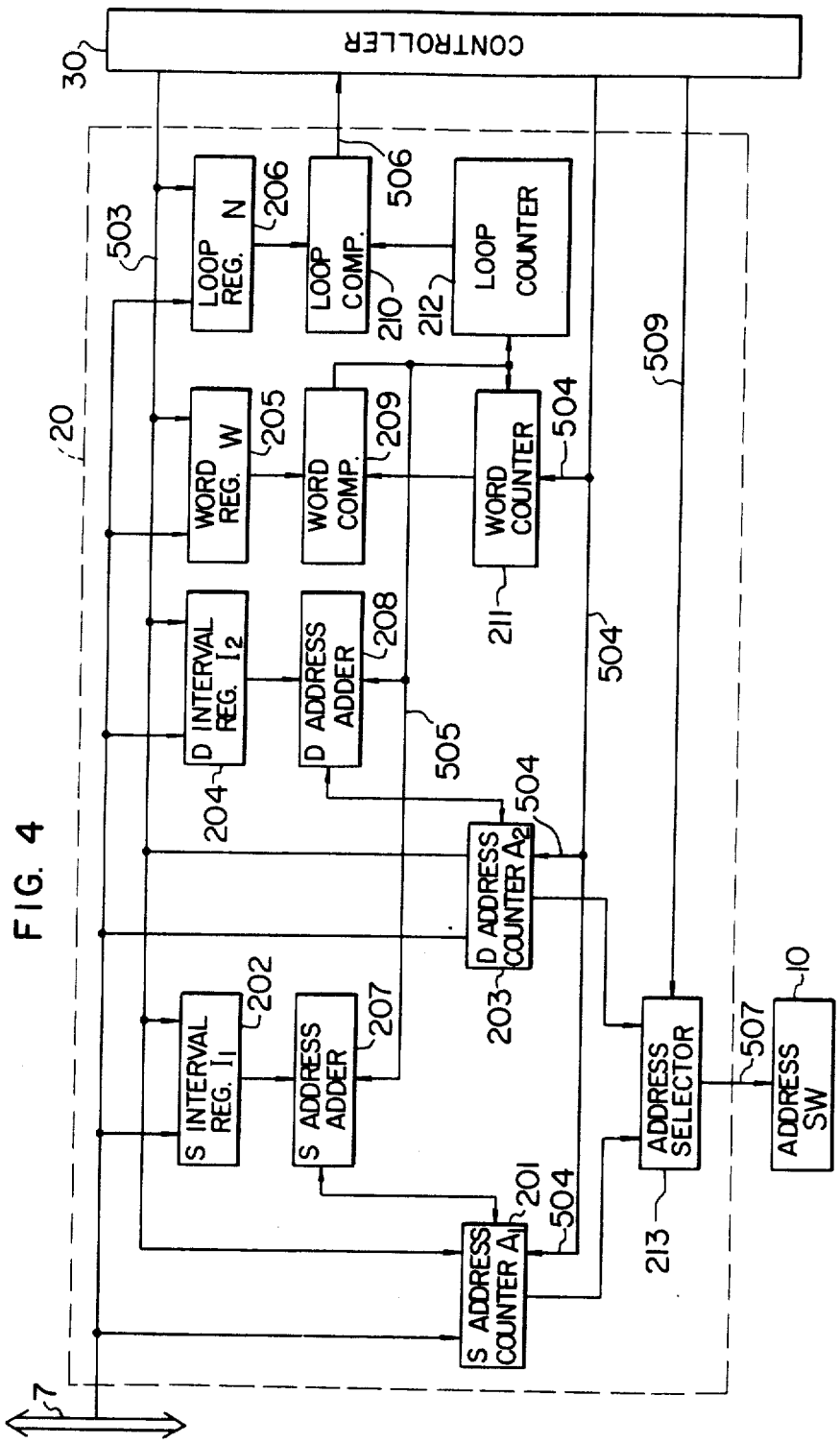
FIG. 4 shows a block diagram of an address generator shown in FIG. 3.

FIG. 2A illustrates a transfer function of document image data. Legends in FIG. 2A have the following meanings.

$A_1$: source start address $A_2$: destination start address

W: lateral length of data (effective data) to be transferred $I_1$: interval of effective data at a source $I_2$: interval of effective data at a destination N: number of times of repetition for transferring effective data (longitudinal length of effective data)

In FIG. 2A, when $I_1 > 0$ and $I_2 > 0$, the position of a partial image is moved as shown in (A) of FIG. 2B. When $I_1 > 0$ and $I_2 = 0$, the partial image is extracted as shown in (B) of FIG. 2B, and when $I_1 = 0$ and $I_2 > 0$, the partial image is synthesized as shown in (C) of FIG. 2B, and when $I_1 = 0$ and $I_2 = 0$, a fast block transfer operation is carried out.

The memory control unit of the present invention carries out any of those processes at a high speed.

FIG. 3 shows a block diagram of one embodiment of the memory control unit of the present invention. In FIG. 3, a block encircled by broken lines is a memory control unit 5. It is located between a central processing unit (CPU) 3 and a memory 4 and is connected with the CPU 3 via an address bus 6, a data bus 7 and a control bus 8.

The memory control unit 5 comprises an address switch 10, an address generator 20, a controller 30, a read/write buffer 40 and a read/write switch 50.

When an operation mode signal 501 sent from the controller 30 specifies a mode 1 (in which the memory 4 is used as a main memory unit of the CPU 3), the address switch 10 sends out an address received from the address bus 6 to the memory 4. When the mode signal 501 specifies a mode 2 (in which the memory 4 is used to extract or synthesize a partial image), the address switch 10 sends out an address 507 received from the address generator 20 to the memory 4.

The read/write buffer 40 is a buffer in which the data read from the memory 4 or the data to be written into the memory 4 is stored. It is operated in two steps. In a first step, the data is read into the read/write buffer 40 and in a second step the data is sent out. A read/write strobe signal 502 sent from the read/write switch 50 determines a source of the data and a destination of the data. When the mode signal 501 specifies the mode 1, the read/write strobe signal 502 specifies the read operation if a request by the CPU 3 is the read operation, and specifies the write operation if the request is the write operation. In the read operation, the data is fetched from the memory 4 to the read/write buffer 40 in the first step, and the data is sent to the CPU 3 in the second step. The write operation is opposite to the above.

On the other hand, when the mode signal 501 specifies the mode 2, the read/write strobe signal 502 alternately specifies the read operation and the write operation. In the first step, the data is fetched from the memory 4 to the read/write buffer 40, and in the second step the data is sent to the memory 4 instead of the CPU 3. Thus, the data transfer within the memory 4 without routing to the buses 6 to 8 is attained.

The read/write switch 50 generates the read/write strobe signal 502. In the mode 1, it specifies the read operation or the write operation in accordance with the read request or write request of the CPU 3. In the mode 2, it alternately specifies the read operation and the write operation.

The address generator 20 calculates a source address and a destination address in the mode 2. FIG. 4 shows a block diagram of the address generator 20. In FIG. 4, numerals 201-206 designate registers or counters for storing parameters shown in FIG. 2, which are a source address counter 201, a source interval register 202, a destination address counter 203, a destination interval register 204, a word register 205 and a loop register 206. These registers and counters read in initial data sent from the CPU 3 in synchronism with an initial data strobe signal 503 sent from the controller 30.

An address selector 213 selects the content of the source address counter 201 at the timing of a read signal of a read/write select signal 509 (see FIG. 6) and selects the contents of the destination address counter 203 at the timing of a write signal and sends the selected address 507 to the address switch 10. The address counters 201 and 203 and the word counter 211 are incremented by one by each address control pulse 504 shown in FIG. 6. When the content of the word counter 211 and the content of the word register 205 are equal, a comparator 209 detects it and sends a carry signal 505 to adders 207 and 208, the word counter 211 and the loop counter 212. The adder 207 responds to the carry signal 505 to add the content of the source address counter 201 to the content of the source interval register 202 and sends a resulting sum back to the source address counter 201. The adder 208 also responds to the carry signal 505 to add the content of the destination address counter 203 to the content of the destination interval register 204 and sends a resulting sum back to the destination address counter 203. In this manner, by jumping the contents of the source address counter 201 and the destination address counter 203 in the course of the data transfer, the discontinuous data can be transferred continuously.

The word counter 211 responds to the carry signal 505 to clear the content thereof to the initial value 0. It also responds to the carry signal 505 to increment the content of the loop counter 212 by one.

Subsequently, the above operations are repeated so that the content of the loop counter 212 is sequentially counted up from the initial value 0. When the content reaches the content of the loop register 206, a comparator 210 detects it and sends a transfer end signal 506 to the controller 30.

Figure 5:
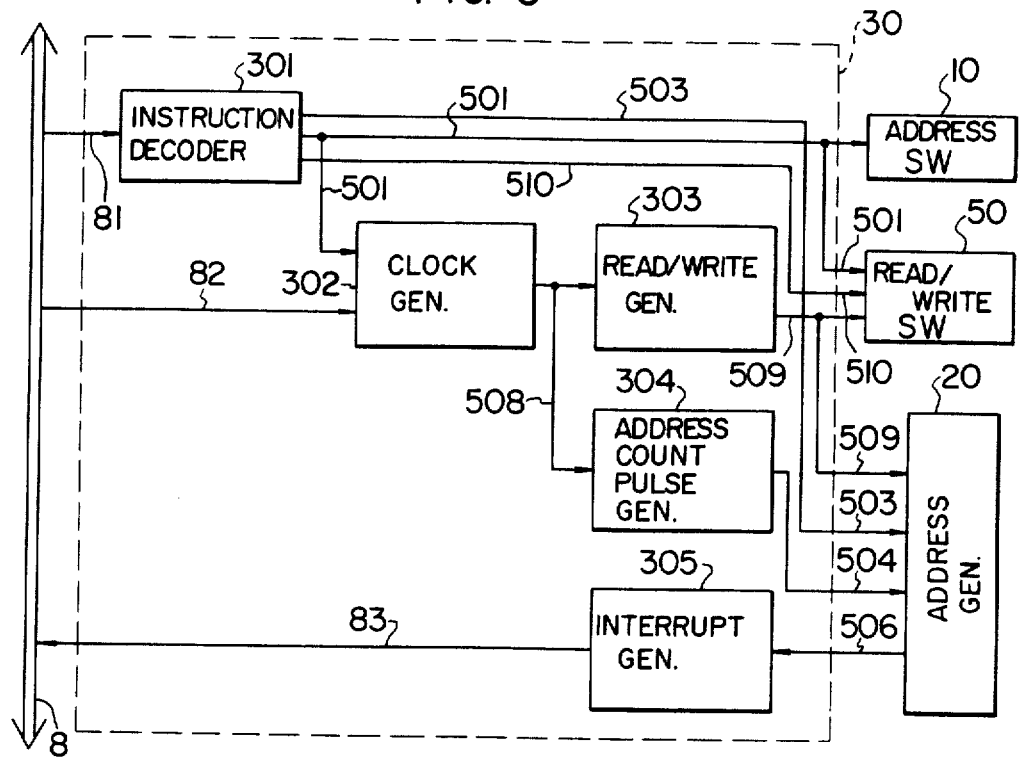
FIG. 5 shows a block diagram of a controller shown in FIG. 3.

The controller 30 controls the address generator 20. It is shown in detail in FIG. 5. The controller 30 comprises an instruction decoder 301, a clock generator 302, a read/write generator 303, an address count pulse generator 304 and an interrupt signal generator 305.

The instruction decoder 301 decodes an instruction signal 81 sent from the CPU 3 through the control bus 8, determines the mode of the control signal, generates the mode signal 501, and sends it to the clock generator 302, the address switch 10 and the read/write switch 50. In the mode 1, the instruction decoder 301 sends the instruction signal 81 as received from the control bus 8 to the read/write switch 50 without any modification (510). In the mode 2, it decodes the instruction signal 81 and sends the decoded signal to the address generator 20 as the initial data strobe signal 503. The clock generator 302 receives the operation mode signal 501 sent from the instruction decoder 301 and a timing pulse 82 sent from the CPU 3 through the control bus 8. In the mode 2, it divides the timing pulse 82 and sends the divided timing pulse to the read/write generator 303 and the address count pulse generator 304 as an operation clock signal 508. In the mode 1, the clock signal 508 is not generated.

Figure 6:
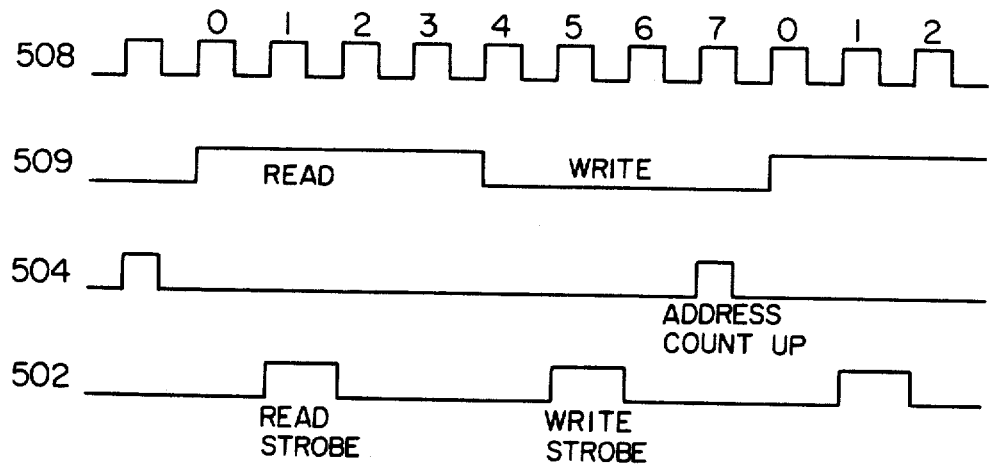
FIG. 6 shows a timing chart for a synchronizing signal and a read/write signal.

In the mode 2, the read/write generator 303 alternately specifies the read operation and the write operation by the read/write select signal 509 in synchronism with the clock signal 508 and sends it to the address generator 20 and the read/write switch 50 (see FIG. 6).

Similarly, in the mode 2, the address count pulse generator 304 generates an address count pulse 504 in synchronism with the clock signal 508 and sends it to the address generator 20 (see FIG. 6).

The interrupt generator 305 receives the transfer end signal 506 sent from the address generator 20 and converts it to an interrupt signal 83 to the CPU 3 and sends it out to the control bus 8.

As described above, according to the memory control unit 5 of the present invention, all of the control signals and data are transferred without any modification between the CPU 3 and the memory 4 in the mode 1 as is the case of a conventional main memory unit. Accordingly, in the mode 1, the memory 4 plays the same roll as the conventional main memory unit.

On the other hand, in the mode 2, the memory 4 first operates in the read mode and it is addressed by the content of the source address counter 201 so that the source data is fetched to the read/write buffer 40. In the second step, the memory 4 is switched to the write mode and it is addressed by the content of the destination address counter 203 so that the data stored in the read/write buffer 40 is stored in the destination address. In this manner, the data in the memory 4 is transferred within the memory at a high speed without using the buses 6-8.

The contents of the source address counter 201 and the destination address counter 203 are not only incremented by one for each transfer but also predetermined counts ($I_1$, $I_2$) are added thereto at a constant interval to enable the transfer of the discontinuous data shown in FIG. 2.

The extraction and the synthesis of the partial image by the present memcry control unit are carried out in the following steps.

(1) The parameters necessary for the transfer (the source start address $A_1$, the destination start address $A_2$, the effective data length $W_1$, the source effective data interval $I_1$, the destination effective data interval $I_2$ and the number N of times of transfer) are set. The data to be specified is set in the registers of the CPU 3 and a parameter setting control signal is sent to the memory control unit 5. Since the parameter setting control signal specifies the mode 2, the instruction decoder 301 in the controller 30 decodes the control signal and generates the corresponding initial data strobe signal 503. Thus, the initial values are set into the registers and counters 201-206 of the address generator 20.

(2) The control signal to instruct the start of the data transfer in the mode 2 is sent from the CPU 3. As a result, the clock signal generator 302 of the controller 30 starts the operation and sends the clock signal 508 to the read/write signal generator 303. The data transfer for the extraction or the synthesis is carried out in response to the clock signal 508.

(3) When the data transfer has been repeated by the specified N times, the content of the loop counter 212 reaches the content (N) of the loop register 206. The comparator 210 detects it and sends the transfer end signal 506 to the controller 30. The interrupt signal generator 305 of the controller 30 responds to the transfer end signal 506 to stop the operation of the clock signal generator 302 and send the end interrupt signal 83 to the CPU 3. The CPU 3 responds to the end interrupt signal to detect the end of the data transfer.

According to the present invention, the extraction and the synthesis of the partial image and other transfer functions as shown in FIG. 2B can be attained by a single start operation. As a result, no overhead by the software is included and the processing is carried out at a high speed.

In addition, no bus overload occurs because the extraction and synthesis processes are carried out in the memory.

We claim:

1. A memory control unit connected between a memory for storing image data and a processor, comprising:
   (a) address generator means for alternately supplying a read address signal for data to be read out from said memory and a write address signal for data to be written into said memory in each of a plurality of successive operating cycles, including means for altering said read and write addresses by predetermined amounts in each operating cycle;
   (b) controller means for generating a first mode signal and a second mode signal;
   (c) address switch means connected to said processor, said address generator means and said controller means for supplying an address signal from said processor to said memory in response to said first mode signal and for supplying the address signals from said address generator means to said memory in response to said second mode signal;
   (d) a buffer memory connected to said memory; and
   (e) read/write control means responsive to said second mode signal for alternately and repeatedly reading out data from a first area of said memory specified by said read address signal and storing the data so read in said buffer memory and writing data stored in said buffer memory into a second area of said memory specified by said write address signal.

2. A memory control unit according to claim 1 wherein said address generator means includes first counter means for storing a start address $A_1$ of a first area of said memory, second counter means for storing a start address $A_2$ of a second area of said memory, means for incrementing the contents of said first and second counters at a timing having a predetermined relation to the reading and writing operations of said read/write control means, and selector means for alternately applying the outputs of said first and second counter means to said address switch means.

3. A memory control unit according to claim 2 wherein said address generator means further includes first register means for storing information representative of a data block length $W_1$ of multi-block data stored in a first area of said memory second register means for storing information representative of a data block interval $I_1$, third counter means incremented in synchronism with said first and second counter means, and means for jumping the count of said first counter means by the value of said interval $I_1$ stored in said second register means when the content of said first register means and the count of said third counter means are equal.

4. A memory control unit according to claim 2 wherein said address generator means further includes first register means for storing information representative of a data block length $W_1$ of multi-block data stored in a first area of said memory, third register means for storing information representative of a data block interval $I_2$ of data to be stored in a second area of said memory, third counter means incremented in synchronism with said first and second counter means, and means for jumping the count of said second counter means by the value of said interval $I_2$ stored in said third register means when the content of said first register means and the count of said third counter means are equal.

5. A memory control unit according to claim 2 wherein said address generator means further includes first register means for storing information representative of a data block length $W_1$ of multi-block data stored in a first area of said memory, second register means for storing information representative of a data block interval $I_1$ of said data block, third register means for storing information representative of a data block interval $I_2$ of data to be stored in a second area of said memory, third counter means incremented in synchronism with said first and second counter means, and means for jumping the count of said first counter means by the value of said interval $I_1$ stored in said second register means and jumping the count of said second counter means by the value of said interval $I_2$ stored in said third register means when the content of said first register means is equal to the count of said third counter means.

6. A memory control unit according to claim 1 wherein said address generator means further includes fourth register means for storing information representative of the number N of data blocks, fourth counter means for counting the number of time of coincidence of the contents of said third counter means and said first register means detected by said comparing means, and means for terminating the data transfer from said first area of said memory to said second area of said memory by causing the operation of said read/write control means to be stopped when the count of said fourth counter means becomes equal to the content of said fourth register means.

7. A memory control unit according to claims 3 or 5, wherein said means for jumping the count of said first counter means comprises means for comparing the content of said first register means and the count of said third counter means to detect coincidence therebetween and means connected to said comparing means for arithmetically combining the count of said first counter means and the content of said second register means and for placing the result in said first counter means when coincidence is detected by said comparing means.

8. A memory control unit according to claims 4 or 5 wherein said means for jumping the count of said second counter means comprises means for comparing the content of said first register means and the count of said third counter means to detect coincidence therebetween, and means connected to said comparing means for arithmetically combining the count of said second counter means and the content of said third register means and for placing the result in said second counter means when coincidence is detected by said comparing means.

9. A memory control unit according to claims 3, 4 or 5 wherein said means for jumping the count includes means for comparing the content of said first register means and the count of said third counter means and for producing an output when coincidence is detected, the output of said comparing means being applied to said third counter means to reset the count thereof.

10. A memory control unit according to claim 1, wherein said controller means includes decoder means connected to receive a control signal from said processor for generating either said first mode signal or said second mode signal upon detecting said control signal.

11. A memory control unit according to claim 10, wherein said controller means further includes clock generator means connected to receive timing signals from said processor and responsive to said second mode signal for generating alternate read and write signals and for applying said read and write signals to said read/write control means.

12. A memory control unit according to claim 11 wherein said address generator means includes first counter means for storing a start address $A_1$ of the first area of said memory, second counter means for storing a start address $A_2$ of a second area of said memory, means for incrementing the contents of said first and second counters at a timing having a predetermined relation to the reading and writing operations of said read/write control means, and selector means for alternately applying the outputs of said first and second counter means to said address switch means.

13. A memory control unit according to claim 12, wherein said controller means includes address count pulse generator means connected to said clock generator means for producing an incrementing pulse in synchronism with each period of generation of a read signal and a write signal by said clock generator means.

* * * * *